(12) United States Patent
Shimada et al.

(10) Patent No.: US 9,536,668 B2
(45) Date of Patent: Jan. 3, 2017

(54) MULTILAYER CERAMIC CAPACITOR AND METHOD FOR PRODUCING MULTILAYER CERAMIC CAPACITOR

(71) Applicant: Murata Manufacturing Co., Ltd., Nagaokakyo-shi, Kyoto-fu (JP)

(72) Inventors: Kohei Shimada, Nagaokakyo (JP); Katsuya Ishida, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/948,419

(22) Filed: Nov. 23, 2015

(65) Prior Publication Data

US 2016/0155570 A1    Jun. 2, 2016

(30) Foreign Application Priority Data

Nov. 28, 2014  (JP) .................................. 2014-241467

(51) Int. Cl.
*H01G 4/12*     (2006.01)
*C04B 35/468*   (2006.01)
(Continued)

(52) U.S. Cl.
CPC ......... *H01G 4/1227* (2013.01); *C04B 35/4682* (2013.01); *H01G 4/008* (2013.01);
(Continued)

(58) Field of Classification Search
CPC .................... H01G 4/1227; C04B 35/4682
See application file for complete search history.

(56) References Cited

U.S. PATENT DOCUMENTS

| 7,968,486 B2 * | 6/2011 | Yamaguchi | ............ | B82Y 30/00 |
| | | | | 361/321.4 |
| 8,184,428 B2 * | 5/2012 | Yamaguchi | ............ | B82Y 30/00 |
| | | | | 361/321.4 |

(Continued)

FOREIGN PATENT DOCUMENTS

| JP | 2009-176801 A | 8/2009 |
| KR | 10-2008-0017344 A | 2/2008 |
| WO | 2009/001597 A1 | 12/2008 |

OTHER PUBLICATIONS

Official Communication issued in corresponding Korean Patent Application No. 10-2015-0166555, mailed on Oct. 12, 2016.

*Primary Examiner* — Karl Group
(74) *Attorney, Agent, or Firm* — Keating & Bennett, LLP (57) ABSTRACT

A multilayer ceramic capacitor includes a multilayer body including dielectric ceramic layers and inner electrode layers containing Ni and electrically connected to outer electrodes. The dielectric ceramic layers contain a Ba- and Ti-containing perovskite compound, Ca, Mg, R (at least one rare earth metal selected from La, Ce, Pr, Nd, Sm, Eu, Gd, Tb, Dy, Ho, Er, Tm, Yb, Lu, and Y), M (at least one selected from Zr, Mn, Co, Fe, Cr, Cu, Al, V, Mo, and W), and Si. The number of parts by mole of each element relative to Ti as 100 parts is as follows:
  Ca, approximately 0.10 to 5.00 parts;
  Mg, approximately 0.0010 to 0.0098 parts;
  R in total, approximately 0.50 to 4.00 parts;
  M in total, approximately 0.10 to 2.00 parts; and
  Si, approximately 0.5 to 2.0 parts.

21 Claims, 1 Drawing Sheet

(51) Int. Cl.
*H01G 4/30* (2006.01)
*H01G 4/008* (2006.01)
*H01G 4/012* (2006.01)

(52) U.S. Cl.
CPC ........... *H01G 4/012* (2013.01); *H01G 4/1245* (2013.01); *H01G 4/30* (2013.01)

(56) References Cited

U.S. PATENT DOCUMENTS

| | | | |
|---|---|---|---|
| 8,383,535 B2 * | 2/2013 | Yamaguchi | C04B 35/46 361/321.4 |
| 2008/0112109 A1 | 5/2008 | Muto et al. | |
| 2010/0097740 A1 | 4/2010 | Yamaguchi | |

* cited by examiner

MULTILAYER CERAMIC CAPACITOR AND METHOD FOR PRODUCING MULTILAYER CERAMIC CAPACITOR

BACKGROUND OF THE INVENTION

1. Field of the Invention

The present invention relates to a multilayer ceramic capacitor and a method for producing a multilayer ceramic capacitor.

2. Description of the Related Art

A multilayer ceramic capacitor includes a sintered ceramic body obtained through the firing of alternately stacked dielectric ceramic and inner electrode layers and outer electrodes formed on both end surfaces of the sintered ceramic body.

With their high capacitance in a small size resulting from such a structure, multilayer ceramic capacitors have become widely used in many applications in the wake of the recent increase in the demand for mobile gear and other portable devices.

Smaller and higher-capacitance multilayer ceramic capacitors are in demand. To meet this demand, researchers are trying to reduce the thickness of dielectric ceramic layers in a multilayer ceramic capacitor. Thinning the dielectric ceramic layers, however, leads to making the field strength per layer relatively high. Dielectric ceramic layers are therefore required to be of higher reliability under voltage, in particular, service life characteristics in high-temperature loading tests.

A known dielectric ceramic layer for multilayer ceramic capacitors contains barium titanate as a major ingredient and some other minor ingredients.

For example, International Publication No. 2009/001597 describes a dielectric ceramic including barium-titanate-based crystal grains and a grain boundary layer existing between the crystal grains. Besides barium titanate, the ceramic contains magnesium, yttrium, manganese, and lutetium.

In International Publication No. 2009/001597, a mixed powder compounded of $BaCO_3$, $TiO_2$, $MgO$, $Y_2O_3$, and manganese carbonate powders is fired into a calcined powder. This calcined powder is mixed with a predetermined amount of $Lu_2O_3$ powder, and the resulting mixture is fired. In this way, a desired dielectric ceramic is produced.

SUMMARY OF THE INVENTION

Mg as a raw material for the dielectric ceramic described in International Publication No. 2009/001597 is intended for slowing down the growth of crystal grains during firing. Slowing down the growth of crystal grains ensures that the resulting barium-titanate-based powder is composed of fine powders uniform in diameter.

The inner electrode layers of a multilayer ceramic capacitor usually contain Ni.

Based on these facts, the inventors of the present invention described herein produced multilayer ceramic capacitors including dielectric ceramic layers made from a Mg-containing barium-titanate-based powder and Ni-containing inner electrode layers stacked alternately with them. As a result, the inventors discovered that in such a multilayer ceramic capacitor, Ni in the inner electrode layers and Mg in the dielectric ceramic layers often form a Ni—Mg segregation phase.

The Ni—Mg segregation phase makes the inner electrode layers swell and the dielectric ceramic layers locally thin. The swollen inner electrode layers form short circuits, and these short circuits affect the overall reliability of the multilayer ceramic capacitor.

Removing Mg from the materials for the barium-titanate-based powder to prevent the formation of the Ni—Mg segregation phase leads to abnormal grain growth during firing. The abnormal grain growth can also affect the overall reliability of the ceramic capacitor.

In view of the above, preferred embodiments of the present invention provide multilayer ceramic capacitors that are highly reliable as a result of prevention of loss of reliability caused by formation of a Ni—Mg segregation phase and by abnormal grain growth.

According to a preferred embodiment of the present invention, a multilayer ceramic capacitor includes a multilayer body including a plurality of dielectric ceramic layers and a plurality of inner electrode layers; and outer electrodes on the multilayer body, the outer electrodes electrically connected to the inner electrode layers exposed on the multilayer body.

The inner electrode layers include Ni.

The dielectric ceramic layers contain a Ba- and Ti-containing perovskite compound, Ca, Mg, R, M, and Si. R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W. The number of parts by mole of each element with respect to 100 parts by mole of the Ti is expressed as follows:

Ca is approximately 0.10 parts by mole or more and approximately 5.00 parts by mole or less;

Mg is approximately 0.0010 parts by mole or more and approximately 0.0098 parts by mole or less;

R in total is approximately 0.50 parts by mole or more and approximately 4.00 parts by mole or less;

M in total is approximately 0.10 parts by mole or more and approximately 2.00 parts by mole or less; and Si is approximately 0.5 parts by mole or more and approximately 2.0 parts by mole or less.

The dielectric ceramic layers of a multilayer ceramic capacitor according to a preferred embodiment of the present invention include a Ba- and Ti-containing perovskite compound and some other minor ingredients. One of the minor ingredients is Mg, and the Mg content relative to the Ti content as 100 parts by mole is approximately 0.0010 parts by mole or more and approximately 0.0098 parts by mole or less. Such a quantity of Mg is much smaller than the quantities of Mg that have been commonly used to slow down grain growth. In an alternate stack of these dielectric ceramic layers and Ni-containing inner electrode layers, therefore, no or little Ni—Mg segregation phase forms. The loss of the overall reliability of the multilayer ceramic capacitor associated with this factor is prevented, making the multilayer ceramic capacitor highly reliable.

A multilayer ceramic capacitor according to a preferred embodiment of the present invention includes components Ca, R, M, and Si in addition to Mg. In particular, the component R, at least one rare earth metal, has the effect of slowing down grain growth. The loss of reliability associated with abnormal grain growth is therefore prevented despite the low Mg content. This also contributes to the high reliability of the multilayer ceramic capacitor.

According to another preferred embodiment of the present invention, a multilayer ceramic capacitor includes a multilayer body including a plurality of dielectric ceramic layers and a plurality of inner electrode layers; and outer electrodes on the multilayer body, the outer electrodes electrically connected to the inner electrode layers exposed on the multilayer body.

The inner electrode layers include Ni.

The multilayer body contains a Ba- and Ti-containing perovskite compound, Ca, Mg, R, M, and Si. R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W. The number of parts by mole of each element with respect to 100 parts by mole of the Ti is expressed as follows:

Ca is approximately 0.10 parts by mole or more and approximately 5.00 parts by mole or less;

Mg is approximately 0.0010 parts by mole or more and approximately 0.0098 parts by mole or less;

R in total is approximately 0.50 parts by mole or more and approximately 4.00 parts by mole or less;

M in total is approximately 0.10 parts by mole or more and approximately 2.00 parts by mole or less; and Si is approximately 0.5 parts by mole or more and approximately 2.0 parts by mole or less.

In this preferred embodiment, the composition of the multilayer body is specified in the same way as that of the dielectric ceramic layers above. This preferred embodiment also provides a highly reliable ceramic capacitor.

According to yet another preferred embodiment of the present invention, a multilayer ceramic capacitor includes a multilayer body including a plurality of dielectric ceramic layers and a plurality of inner electrode layers; and outer electrodes on the multilayer body, the outer electrodes electrically connected to the inner electrode layers exposed on the multilayer body.

The inner electrode layers include Ni.

The multilayer body contains a Ba- and Ti-containing perovskite compound, Ca, Mg, R, M, and Si. R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W. The number of parts by mole of each element with respect to 100 parts by mole of the Ti in a solution of the multilayer body is expressed as follows:

Ca is approximately 0.10 parts by mole or more and approximately 5.00 parts by mole or less;

Mg is approximately 0.0010 parts by mole or more and approximately 0.0098 parts by mole or less;

R in total is approximately 0.50 parts by mole or more and approximately 4.00 parts by mole or less;

M in total is approximately 0.10 parts by mole or more and approximately 2.00 parts by mole or less; and Si is approximately 0.5 parts by mole or more and approximately 2.0 parts by mole or less.

In this preferred embodiment, the number of parts by mole of each element in a solution of the multilayer body is specified in the same way as that of each element in the dielectric ceramic layers above. This preferred embodiment also provides a highly reliable ceramic capacitor.

For a multilayer ceramic capacitor according to a preferred embodiment of the present invention, it is preferred that the R be $R^1$. $R^1$ denotes at least one selected from Y, Dy, Gd, La, Ho, Er, Sm, and Yb.

For a multilayer ceramic capacitor according to a preferred embodiment of the present invention, furthermore, it is preferred that the R include $R^1$ and $R^2$ with the total amount in parts by mole of $R^1$/the total amount in parts by mole of $R^2$≥approximately 4.0. $R^1$ denotes at least one selected from Y, Dy, Gd, La, Ho, Er, Sm, and Yb, and $R^2$ denotes at least one selected from Ce, Pr, Nd, Eu, Tm, Lu, and Tb.

The $R^1$ rare earth metals more effectively prevent the movement of oxygen vacancies than the other R rare earth metals when existing in the dielectric ceramic layers (or the multilayer body including the dielectric ceramic layers). The use of only $R^1$ as the R or a combination of $R^1$ and $R^2$ with the proportion in parts by mole of $R^1$ set as high as at least approximately four times larger than that of $R^2$ therefore makes the multilayer ceramic capacitor even more reliable.

According to a preferred embodiment of the present invention, a method for producing a multilayer ceramic capacitor includes mixing a main component powder based on a Ba- and Ti-containing perovskite compound as a main component with a Ca compound, a Mg compound, a compound containing R, a compound containing M, and a Si compound, and then producing ceramic slurry, where R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W; producing ceramic green sheets from the ceramic slurry; stacking the ceramic green sheets and inner electrode layers into an unfired multilayer body; and firing the unfired multilayer body to obtain a multilayer body including dielectric ceramic layers and Ni-containing inner electrode layers interposed therebetween.

The number of parts by mole of each element in the ceramic slurry with respect to 100 parts by mole of the Ti is expressed as follows:

Ca is, approximately 0.10 parts by mole or more and approximately 5.00 parts by mole or less;

Mg is approximately 0.0010 parts by mole or more and approximately 0.0098 parts by mole or less;

R in total is approximately 0.50 parts by mole or more and approximately 4.00 parts by mole or less;

M in total is approximately 0.10 parts by mole or more and approximately 2.00 parts by mole or less; and Si is approximately 0.5 parts by mole or more and approximately 2.0 parts by mole or less.

In a method according to this preferred embodiment of the present invention for producing a multilayer ceramic capacitor, the elements contained in the ceramic slurry are selected within their respective preferred ranges, and the number of parts by mole of each element is in its preferred range. This ensures that the dielectric ceramic layers and the multilayer body, which are produced from the ceramic slurry, contain preferred numbers of parts by mole of preferred elements. As a result, a highly reliable multilayer ceramic capacitor is produced.

In a method according to a preferred embodiment of the present invention for producing a ceramic multilayer capacitor, it is preferred that the R be $R^1$. $R^1$ denotes at least one selected from Y, Dy, Gd, La, Ho, Er, Sm, and Yb.

In a method according to a preferred embodiment of the present invention for producing a ceramic multilayer capacitor, furthermore, it is preferred that the R include $R^1$ and $R^2$ with the total amount in parts by mole of $R^1$/the total amount of $R^2$ approximately 4.0. $R^1$ denotes at least one selected from Y, Dy, Gd, La, Ho, Er, Sm, and Yb, and $R^2$ denotes at least one selected from Ce, Pr, Nd, Eu, Tm, Lu, and Tb.

Any $R^1$ rare earth metal existing as an R in the ceramic slurry will be carried over to the resulting multilayer ceramic capacitor.

The rare earth metals in this group more effectively prevent the movement of oxygen vacancies than the other R rare earth metals. The use of only $R^1$ as the R or a combination of $R^1$ and $R^2$ with the proportion in parts by mole of $R^1$ set as high as at least approximately four times larger than that of $R^2$ therefore makes the multilayer ceramic capacitor even more reliable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
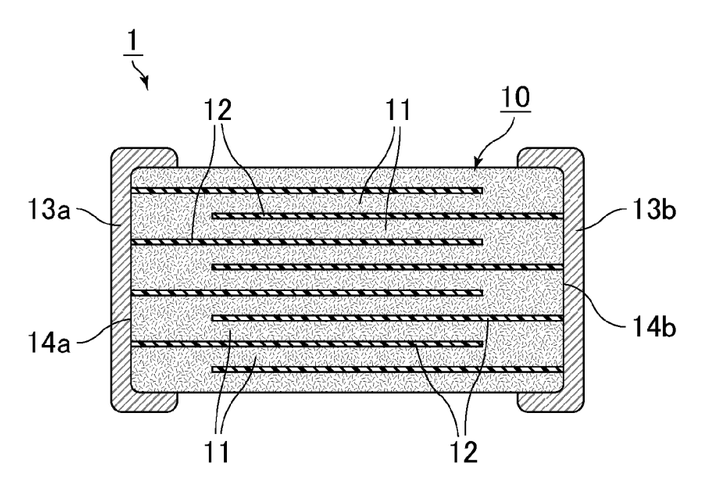
The FIGURE is a cross-sectional diagram that schematically illustrates an example of a structure of a multilayer ceramic capacitor according to a preferred embodiment of the present invention.

The following describes, with reference to the drawing, a multilayer ceramic capacitor according to a preferred embodiment of the present invention and a method according to a preferred embodiment of the present invention for producing a multilayer ceramic capacitor.

Note that the structures of capacitors and production methods described hereinafter are not the only possible forms of the present invention and can optionally be modified within the gist of the present invention. The present invention includes any combination of two or more of its preferred embodiments, modifications thereof and desirable forms described hereinafter.

The FIGURE is a cross-sectional diagram that schematically illustrates an example of a structure of a multilayer ceramic capacitor according to a preferred embodiment of the present invention.

The multilayer ceramic capacitor 1 includes a multilayer body 10 that includes a stack of multiple dielectric ceramic layers 11 and multiple inner electrode layers 12.

The inner electrode layers 12 are exposed on the multilayer body 10, alternately on opposite end surfaces 14a and 14b of the multilayer body 10.

On both end surfaces 14a and 14b of the multilayer body 10, there are a pair of outer electrodes 13a and 13b electrically connected to the inner electrode layers 12.

The dielectric ceramic layers 11 of the multilayer ceramic capacitor 1 contain a Ba- and Ti-containing perovskite compound, Ca, Mg, R (at least one rare earth metal selected from La, Ce, Pr, Nd, Sm, Eu, Gd, Tb, Dy, Ho, Er, Tm, Yb, Lu, and Y), M (at least one selected from Zr, Mn, Co, Fe, Cr, Cu, Al, V, Mo, and W), and Si.

The Ba- and Ti-containing perovskite compound can be, for example, a perovskite compound represented by general formula $ABO_3$ (where site A is Ba, with or without at least one selected from the group consisting of Sr and Ca, site B is Ti, with or without at least one selected from the group consisting of Zr and Hf, and O is oxygen) and existing in the form of a sintered body in which the main-phase grains are barium-titanate-based ceramic particles.

The dielectric ceramic layers 11 contain some other minor ingredients in addition to the Ba- and Ti-containing perovskite compound. It is preferred that the central section of the crystal grains of the perovskite compound be free of Ca. Furthermore, it is preferred that the Zr content of the central section of the crystal grains of the perovskite compound be approximately 0.02 parts by mole or less relative to the Ti content as 100 parts by mole. The minor ingredients in the dielectric ceramic layers 11 can be in any form of existence. For example, the minor ingredients may be present somewhere of the crystal grains of the perovskite compound. To be specific, it is preferred that the crystal grains have a core section that is a particle of the Ba- and Ti-containing perovskite compound and a shell section that is a solid solution of the minor elements around the core Ba- and Ti-containing perovskite compound particle.

More specifically, it is more preferred that the crystal grains have a core section that is a barium titanate particle free of at least Ca and a shell section that is a solid solution of Ca, Mg, R, M, and Si around the core section.

In particular, it is preferred that the crystal grains have a core section that is a $Ba_mTiO_3$ particle (approximately $0.980 \leq m \leq$ approximately 1.020) free of Ca, Mg, R, M, and Si and a shell section that is a solid solution of Ca, Mg, R, M, and Si around the core $Ba_mTiO_3$ particle.

It is also possible that the minor ingredients in the form of oxides or similar exist in grain boundaries or triple points.

R denotes at least one rare earth metal selected from La, Ce, Pr, Nd, Sm, Eu, Gd, Tb, Dy, Ho, Er, Tm, Yb, Lu, and Y.

The R can therefore be a single or multiple rare earth metals.

It is preferred that the R be $R^1$ (at least one selected from Y, Dy, Gd, La, Ho, Er, Sm, and Yb).

It is also preferred that the R include $R^1$ (at least one selected from Y, Dy, Gd, La, Ho, Er, Sm, and Yb) and $R^2$ (at least one selected from Ce, Pr, Nd, Eu, Tm, Lu, and Tb) with the total amount (parts by mole) of $R^1$/the total amount (parts by mole) of $R^2 \geq$ approximately 4.0.

The total amount of $R^1$ means that the R may include two or more $R^1$ elements and in such a case this amount refers to the total number of parts by mole of the two or more $R^1$ elements.

Likewise, the total amount of $R^2$ means that the R may include two or more $R^2$ elements and in such a case this amount refers to the total number of parts by mole of the two or more $R^2$ elements.

In the dielectric ceramic layers, the number of parts by mole of each element relative to the Ti content as 100 parts by mole is as follows:

Ca, approximately 0.10 parts by mole or more and approximately 5.00 parts by mole or less;

Mg, approximately 0.0010 parts by mole or more and approximately 0.0098 parts by mole or less;

R in total, approximately 0.50 parts by mole or more and approximately 4.00 parts by mole or less;

M in total, approximately 0.10 parts by mole or more and approximately 2.00 parts by mole or less; and Si, approximately 0.5 parts by mole or more and approximately 2.0 parts by mole or less.

The prevention of the two types of loss of reliability, the loss caused by the formation of a Ni—Mg segregation phase and that by abnormal grain growth, and therefore the resulting high reliability of the multilayer ceramic capacitor, are attained only when the proportions of Ca, Mg, R in total, M in total, and Si to the Ti content as 100 parts by mole meet all of these conditions.

The amounts of R in total and M in total mean that the dielectric ceramic layers 11 may contain more than one R and more than one M and in such a case these amounts refer to the total numbers of parts by mole of the more than one R and the more than one M, respectively.

As mentioned above, Ca as one of the minor ingredients may exist as an element for site A of the Ba- and Ti-containing perovskite compound, and Zr as an M element may exist as an element for site B of the Ba- and Ti-containing perovskite compound. In such a case, the number of parts by mole of Ca and that of Zr are defined as the total amount of the element for site A or B of the Ba- and Ti-containing perovskite compound and any other form of the element. The number of parts by mole of each element is a measurement obtained through ICP analysis of a solution of the multilayer body and, therefore, is independent of the locations where the element exists in the multilayer body.

In another preferred embodiment of a multilayer ceramic capacitor according to the present invention, the composition of the multilayer body is specified in the same way as that of the dielectric ceramic layers above.

In yet another preferred embodiment of a multilayer ceramic capacitor according to the present invention, the number of parts by mole of each element in a solution of the multilayer body is specified in the same way as that of each element in the dielectric ceramic layers above. An example of a method for preparing the solution of the multilayer body is alkali fusion.

The following lists preferred and more preferred ranges of the number of parts by mole of each element relative to the Ti content as 100 parts by mole:

Ca, preferably approximately 0.50 to 2.00 parts by mole, more preferably approximately 0.75 to 1.50 parts by mole;

Mg, preferably approximately 0.0010 to 0.0090 parts by mole, more preferably approximately 0.0010 to 0.0075 parts by mole;

R in total, preferably approximately 0.60 to 3.00 parts by mole, more preferably approximately 0.75 to 2.00 parts by mole;

M in total, preferably approximately 0.20 to 1.50 parts by mole, more preferably approximately 0.25 to 1.00 part by mole; and Si, preferably approximately 0.6 to 1.9 parts by mole, more preferably approximately 0.8 to 1.6 parts by mole.

The inner electrode layers 12 are electrode layers containing Ni. Specific examples include electrode layers containing metallic nickel and electrode layers containing a nickel alloy.

The outer electrodes 13a and 13b can be, for example, Ag- or Cu-based electrodes.

A specific example is one composed of a thick coating formed through the firing of a copper-containing conductive paste, a nickel plating film on the thick coating, and a tin plating film on the nickel plating. Electrodes having a known structure can be used.

The multilayer ceramic capacitor 1 may be a two-terminal capacitor having two outer electrodes 13a and 13b, and it may also be a multi-terminal capacitor having more than two outer electrodes.

The following describes a non-limiting example of a method according to a preferred embodiment of the present invention for producing a multilayer ceramic capacitor.

First, a Ba- and Ti-containing perovskite compound is produced.

The process for producing the perovskite compound is not limited. Known processes such as the solid-phase process, hydrothermal synthesis, and hydrolysis can be used.

The site A/site B ratio of the perovskite compound (general formula $ABO_3$) need not be stoichiometric as long as the advantages of the invention are attained. It is, however, preferred that the ratio A/B by mole of site A to site B be approximately in the range of 0.980 to 1.020.

The source of Ba can be, preferably, a Ba compound such as $BaCO_3$. The source of Ti can be, preferably a Ti compound such as $TiO_2$.

Then a main powder based on the Ba- and Ti-containing perovskite compound is mixed with a Ca compound, a Mg compound, a compound containing R, a compound containing M, and a Si compound as sources of Ca, Mg, R, M, and Si as minor ingredients, yielding a ceramic raw material. The relative quantities of the compounds are such that the number of parts by mole of each element relative to the Ti content in the resulting multilayer ceramic capacitor will be in the range specified above.

Examples of forms of the compounds to be mixed in include $CaCO_3$, MgO, an oxide of R (e.g., $R_2O_3$), an oxide of M, and $SiO_2$.

The compounds for minor ingredients can, however, be in any form. Besides oxide and carbonate powders, many forms can be used including chloride powder, sol, and organometallic compounds.

The way of mixing in the compounds for minor ingredients is not limited either. For example, two or more of the compounds for minor ingredients may be blended beforehand, with or without subsequent synthesis through heat treatment. It is also possible to mix in a particular compound for a minor ingredient in two or more additions.

The use of YSZ balls in mixing the raw material can cause the Zr content to be increased due to contamination from the YSZ balls, although by a very small amount.

The obtained ceramic raw material is mixed with an organic binder, a plasticizer, and an organic solvent as necessary using a ball mill or similar, producing ceramic slurry.

The number of parts by mole of each element in the ceramic slurry relative to Ti as 100 parts by mole is as follows:

Ca, approximately 0.10 parts by mole or more and approximately 5.00 parts by mole or less;

Mg, approximately 0.0010 parts by mole or more and approximately 0.0098 parts by mole or less;

R in total, approximately 0.50 parts by mole or more and approximately 4.00 parts by mole or less;

M in total, approximately 0.10 parts by mole or more and approximately 2.00 parts by mole or less; and Si, approximately 0.5 parts by mole or more and approximately 2.0 parts by mole or less.

Then ceramic green sheets are produced from the ceramic slurry. The ceramic green sheets and inner electrode layers are stacked into an unfired multilayer body. The unfired multilayer body is fired, yielding a multilayer body including dielectric ceramic layers and Ni-containing inner electrode layers interposed therebetween. In this way, a multilayer body including multiple dielectric ceramic layers and multiple inner electrode layers is obtained.

A non-limiting example of a process for producing the multilayer body involves forming a coating of a conductive paste for use as a Ni-containing inner electrode layer on the ceramic green sheets, stacking the ceramic green sheets carrying the conductive paste coating, and then firing the stack to obtain a multilayer body including multiple dielectric ceramic layers and multiple inner electrode layers.

Lastly, outer electrodes are formed on both end surfaces of the multilayer body to complete the multilayer ceramic capacitor.

Each of the steps can be performed using known technologies and process conditions.

With regard to firing conditions, it is preferred that the stacked ceramic green sheets be fired in a reducing atmosphere of $H_2$—$N_2$—$H_2O$ gas with an oxygen partial pressure of approximately $10^{-9}$ to $10^{-12}$ MPa at approximately 1180° C. to 1350° C.

An example of a process for forming the outer electrodes involves coating the unfired ceramic green sheets with a conductive paste layer for use as the outer electrodes and firing the conductive paste layer at the same time as the firing of the multilayer body.

EXAMPLES

The following describes some examples that disclose multilayer ceramic capacitors according to a preferred embodiment of the present invention in more detail. Note that these examples are not the only possible forms of various preferred embodiments of the present invention.

Examples 1-1 to 1-15 and Comparative Examples 1-1 to 1-11

A) Preparation of a Ceramic Raw Material

Predetermined amounts of $BaCO_3$ and $TiO_2$ as starting materials were mixed using a ball mill. The mixture was heated at approximately 1150° C., yielding a perovskite compound $Ba_{1.0070}TiO_3$. The average particle diameter was approximately 0.15 μm, and the Ba/Ti ratio was approximately 1.0070.

The obtained $Ba_{1.0070}TiO_3$ (hereinafter also referred to as BT) was mixed with additional components for the Example or Comparative Example using a ball mill in accordance with the mixing formula in Table 1. The resulting mixture was dried, yielding a ceramic raw material.

The additional components were added in the form of $CaCO_3$, $MgO$, $R_2O_3$, an oxide of M, and $SiO_2$.

For use as the $R_2O_3$, powders of the following compounds were prepared: $La_2O_3$, $Pr_2O_3$, $Eu_2O_3$, $Ho_2O_3$, $Er_2O_3$, $Lu_2O_3$, $Ce_2O_3$, $Yb_2O_3$ $TM_2O_3$, $Tb_2O_3$, $Gd_2O_3$, $SM_2O_3$, $Nd_2O_3$, $Y_2O_3$, and $Dy_2O_3$.

ICP analysis was performed on the obtained ceramic raw material, confirming that it had an elemental composition substantially the same as the mixing formula.

The Ca, Mg, R, M, and Si content parameters (parts by mole) in Table 1 represent the proportions of the elements in BT relative to the Ti content as 100 parts by mole.

B) Production of Multilayer Ceramic Capacitors

The ceramic raw material was then wet-blended with a polyvinyl butyral-based binder, a plasticizer, and ethanol as an organic solvent using a ball mill, yielding ceramic slurry.

The obtained ceramic slurry was shaped using lip extrusion into a substantially rectangular ceramic green sheet with a thickness of approximately 4.5 μm.

A Ni-containing conductive paste was then applied to this ceramic green sheet, yielding a coating of a Ni-based conductive paste for use as an inner electrode.

Multiple ceramic green sheets each carrying a conductive paste coating were then stacked, with the coating on one sheet reaching one end of the sheet and that on the next sheet reaching the opposite end of the sheet. In this way, a raw multilayer body was obtained for use as the main body of the capacitors.

The obtained raw multilayer body was heated in a $N_2$ atmosphere at a temperature of approximately 350° C. for approximately 3 hours so that the binder was burnt. The multilayer body was then fired in a reducing atmosphere of a $H_2$—$N_2$—$H_2O$ gas with an oxygen partial pressure of approximately $10^{-10}$ MPa at approximately 1200° C. for approximately 2 hours, yielding a sintered multilayer body.

With regard to structure, the multilayer body included multiple dielectric ceramic layers and multiple inner electrode layers.

This multilayer body was then structurally characterized using XRD, finding that the main component of the dielectric ceramic layers had a barium-titanate-based perovskite structure.

A Cu paste containing glass frit was then applied to both end surfaces of the multilayer body and fired at a temperature of approximately 800° C. in a $N_2$ atmosphere, yielding outer electrodes electrically connected to the inner electrodes. In this way, multilayer ceramic capacitors of the Example or Comparative Examples were obtained.

The outer electrodes of a multilayer ceramic capacitor were polished away, and the resulting multilayer body was dissolved using alkali fusion. ICP analysis was performed on the obtained solution, confirming that the multilayer body had an elemental composition substantially the same as the mixing formula in Table 1 except for Ni as an ingredient of inner electrodes.

The outer dimensions of the obtained multilayer capacitors were as follows: width, approximately 1.25 mm; length, approximately 2.0 mm; thickness, approximately 1.0 mm. The thickness of the dielectric ceramic layers interposed between the inner electrodes was approximately 3.0 μm. The number of effective dielectric ceramic layers was 10, and the overlap of electrodes per layer was approximately 1.6 $mm^2$.

The dielectric ceramic layers of a multilayer ceramic capacitor of each Example were processed into thin layers (from ten randomly selected points), and these thin layers were observed using STEM-EDS for the composition of the central section of a crystal grain. The central section of the crystal grains from all ten measurement points was free of Ca. The STEM equipment used was JEOL "JEM-2200FS," and the acceleration voltage was approximately 200 kV. The EDS detector was JEOL "JED-2300T" with an SDD detector having an aperture of 60 $mm^2$. The EDS system was Thermo Fisher Scientific "Noran System 7."

The above results suggest that the ceramic particles making up the dielectric ceramic layers were had a core section that was a $BaTiO_3$ particle free of at least Ca and a shell section that was a solid solution of Ca, Mg, R, M, and Si around the core $BaTiO_3$ particle.

C) Characterization

The multilayer ceramic capacitors of the Examples and Comparative Examples were evaluated as follows.

(1) Service Life Characteristics in a High-Temperature Loading Test

For each Example or Comparative Example, the time course of the insulation resistance of 100 multilayer ceramic capacitors was observed under a direct voltage of approximately 16 V at approximately 125° C. A multilayer ceramic capacitor was deemed to be a failure at the time when its insulation resistance reached approximately 0.1 MΩ or less. The service life under high-temperature load was assessed on the basis of the number of nonconformities at approximately 1000 hours past the start of the test.

The results of the test are summarized in Table 1.

TABLE 1

|  | Ca content (parts by mole) | Mg content (parts by mole) | R Element | R Content (parts by mole) | M Element | M Content (parts by mole) | Si content (parts by mole) | Nonconformities 1000 hours |
|---|---|---|---|---|---|---|---|---|
| Example 1-1 | 1.35 | 0.0076 | La | 3.37 | Zr | 0.10 | 1.90 | 0 |
| Example 1-2 | 1.59 | 0.0098 | Pr | 0.64 | Fe | 1.89 | 1.05 | 0 |
| Example 1-3 | 2.91 | 0.0057 | Eu | 3.18 | Cr | 1.37 | 0.66 | 0 |
| Example 1-4 | 1.19 | 0.0040 | Ho | 1.86 | Al | 0.81 | 0.50 | 0 |
| Example 1-5 | 4.02 | 0.0078 | Er | 4.00 | V | 1.01 | 1.08 | 0 |
| Example 1-6 | 5.00 | 0.0035 | Lu | 0.69 | Mo | 1.44 | 1.56 | 0 |
| Example 1-7 | 0.25 | 0.0087 | Ce | 0.84 | W | 0.60 | 0.82 | 0 |
| Example 1-8 | 3.26 | 0.0028 | Yb | 3.58 | Co | 0.68 | 1.03 | 0 |
| Example 1-9 | 0.10 | 0.0096 | Tm | 1.13 | Cu | 0.41 | 1.95 | 0 |
| Example 1-10 | 4.47 | 0.0052 | Tb | 0.50 | Zr | 0.98 | 1.52 | 0 |
| Example 1-11 | 0.53 | 0.0021 | Gd | 2.01 | V | 2.00 | 1.20 | 0 |
| Example 1-12 | 4.70 | 0.0075 | Sm | 1.77 | Mn | 1.20 | 0.93 | 0 |
| Example 1-13 | 4.21 | 0.0037 | Nd | 2.78 | Al | 1.02 | 2.00 | 0 |
| Example 1-14 | 3.21 | 0.0010 | Y | 2.55 | W | 0.99 | 1.85 | 0 |
| Example 1-15 | 2.00 | 0.0050 | Dy | 2.00 | Mn | 1.75 | 1.75 | 0 |
| Comparative Example 1-1 | 0.07 | 0.0050 | Dy | 2.00 | Mn | 1.75 | 1.75 | 5 |
| Comparative Example 1-2 | 5.02 | 0.0050 | Dy | 2.00 | Mn | 1.75 | 1.75 | 31 |
| Comparative Example 1-3 | 2.00 | 0.0000 | Dy | 2.00 | Mn | 1.75 | 1.75 | 82 |
| Comparative Example 1-4 | 2.00 | 0.0008 | Dy | 2.00 | Mn | 1.75 | 1.75 | 9 |
| Comparative Example 1-5 | 2.00 | 0.0100 | Dy | 2.00 | Mn | 1.75 | 1.75 | 5 |
| Comparative Example 1-6 | 2.00 | 0.0050 | Dy | 0.47 | Mn | 1.75 | 1.75 | 70 |
| Comparative Example 1-7 | 2.00 | 0.0050 | Dy | 4.02 | Mn | 1.75 | 1.75 | 18 |
| Comparative Example 1-8 | 2.00 | 0.0050 | Dy | 2.00 | Mn | 0.08 | 1.75 | 19 |
| Comparative Example 1-9 | 2.00 | 0.0050 | Dy | 2.00 | Mn | 2.03 | 1.75 | 30 |
| Comparative Example 1-10 | 2.00 | 0.0050 | Dy | 2.00 | Mn | 1.75 | 0.47 | 12 |
| Comparative Example 1-11 | 2.00 | 0.0050 | Dy | 2.00 | Mn | 1.75 | 2.01 | 46 |

Table 1 clearly indicates that the multilayer ceramic capacitors of Examples 1-1 to 1-15, which were multilayer ceramic capacitors according to a preferred embodiment of the present invention, were highly reliable as demonstrated by the number of nonconformities at 1000 hours in the high-temperature loading test being 0.

In contrast, the multilayer ceramic capacitors of Comparative Examples 1-1 to 1-11, in which any of the Ca, Mg, R, M, and Si content parameters relative to the Ti content as 100 parts by mole was out of its specified range, were of low reliability as demonstrated by the occurrence of nonconformities in the high-temperature loading test (5 to 82 nonconformities).

Comparative Example 1-5 resulted in 5 nonconformities. A high Mg content tends to result in Mg forming a Ni—Mg segregation phase with Ni existing in inner electrodes. The formed Ni—Mg segregation phase makes the dielectric ceramic layers locally thin, affecting reliability. Reducing the Mg content into the range of the Mg content parameters in Examples would limit the formation of the segregation phase.

Comparative Example 1-3, free of Mg, resulted in 82 nonconformities, and Comparative Example 1-4, in which the quantity of Mg was too small, resulted in 9. The low reliability in these Comparative Examples appears to be a result of abnormal grain growth.

In the Examples, the adverse effects of the low Mg content were compensated for by the other components and the number of nonconformities was 0, demonstrating that highly reliable multilayer ceramic capacitors were obtained.

Examples 2-1 to 2-11

A) Preparation of a Ceramic Raw Material

B) Production of Multilayer Ceramic Capacitors

As in Example 1-1, the compound BT used in Example 1-1 was mixed with additional components for the Example in accordance with the mixing formula in Table 2, and the obtained ceramic raw material was used to produce multilayer ceramic capacitors.

Example 2-1, in which the R included only Dy, an $R^1$ element, is equivalent to Example 1-15.

In Examples 2-2 to 2-9, two sources of R were used. All of these Examples used one $R^1$ element and one $R^2$ element, with the proportion in parts by mole of $R^1$ set as high as at least approximately four times larger than that of $R^2$ ($R^1/R^2$ approximately 4).

In Example 2-10, the R included only Ce, an $R^2$ element.

In Example 2-11, two sources of R were used. The proportions of Dy, an $R^1$ element, and Ce, an $R^2$ element, were set in such a manner that $R^1/R^2$<approximately 4.

For all of these Examples, ICP analysis was performed on the ceramic raw material and a solution of a multilayer ceramic capacitor in the same way as in Example 1-1. The analysis confirmed that the elemental composition of both was substantially the same as the mixing formula.

Furthermore, as in Example 1-1, the dielectric ceramic layers of a multilayer ceramic capacitor of all these Examples were processed into thin layers (from ten randomly selected points), and these thin layers were observed using STEM-EDS for the composition of the central section of a crystal grain. The central section of the crystal grains from all ten measurement points was free of Ca.

C) Characterization

The multilayer ceramic capacitors of the Examples and Comparative Examples were evaluated as follows.

(1) Service Life Characteristics in a High-Temperature Loading Test

For each Example, the time course of the insulation resistance of 100 multilayer ceramic capacitors was observed under a direct voltage of approximately 16 V at approximately 125° C. A multilayer ceramic capacitor was deemed to be a failure at the time when its insulation resistance reached approximately 0.1 MΩ or less. The service life under high-temperature load was assessed on the basis of the number of nonconformities at approximately 1000 hours and approximately 2000 hours past the start of the test.

The results of the test are summarized in Table 2.

TABLE 2

| | Ca content (parts by mole) | Mg content (parts by mole) | $R^1$ | | $R^2$ | | $R^1 + R^2$ | $R^1/R^2$ | M | | Si content (parts by mole) | Nonconformities | |
|---|---|---|---|---|---|---|---|---|---|---|---|---|---|
| | | | Element | Content (parts by mole) | Element | Content (parts by mole) | | | Element | Content (parts by mole) | | 1000 hours | 2000 hours |
| Example 2-1 | 2.00 | 0.0050 | Dy | 2.00 | — | — | 2.00 | — | Mn | 1.75 | 1.75 | 0 | 0 |
| Example 2-2 | 2.00 | 0.0050 | Y | 3.00 | Ce | 0.75 | 3.75 | 4.0 | Mn | 1.75 | 1.75 | 0 | 0 |
| Example 2-3 | 2.00 | 0.0050 | Gd | 2.00 | Pr | 0.10 | 2.10 | 20.0 | Mn | 1.75 | 1.75 | 0 | 0 |
| Example 2-4 | 2.00 | 0.0050 | La | 2.20 | Nd | 0.21 | 2.41 | 10.5 | Mn | 1.75 | 1.75 | 0 | 0 |
| Example 2-5 | 2.00 | 0.0050 | Ho | 1.70 | Eu | 0.30 | 2.00 | 5.7 | Mn | 1.75 | 1.75 | 0 | 0 |
| Example 2-6 | 2.00 | 0.0050 | Er | 2.60 | Tm | 0.10 | 2.70 | 26.0 | Mn | 1.75 | 1.75 | 0 | 0 |
| Example 2-7 | 2.00 | 0.0050 | Sm | 1.40 | Lu | 0.30 | 1.70 | 4.7 | Mn | 1.75 | 1.75 | 0 | 0 |
| Example 2-8 | 2.00 | 0.0050 | Yb | 2.00 | Tb | 0.01 | 2.01 | 200.0 | Mn | 1.75 | 1.75 | 0 | 0 |
| Example 2-9 | 2.00 | 0.0050 | Ho | 3.99 | Tm | 0.01 | 4.00 | 399.0 | Mn | 1.75 | 1.75 | 0 | 0 |
| Example 2-10 | 2.00 | 0.0050 | — | — | Ce | 2.00 | 2.00 | 0.0 | Mn | 1.75 | 1.75 | 0 | 5 |
| Example 2-11 | 2.00 | 0.0050 | Dy | 2.00 | Ce | 0.51 | 2.51 | 3.9 | Mn | 1.75 | 1.75 | 0 | 5 |

In all of Examples 2-1 to 2-11, the multilayer ceramic capacitors were highly reliable as clearly demonstrated by the number of nonconformities at 1000 hours in the high-temperature loading test being 0.

In particular, Example 2-1, which used only $R^1$ as the R, and Examples 2-2 to 2-9, which used a combination of $R^1$ and $R^2$ with the proportion in parts by mole of $R^1$ set as high as at least approximately four times larger than that of $R^2$, resulted in no nonconformities even at 2000 hours, clearly indicating enhanced reliability in terms of service life under high-temperature load.

The enhanced reliability in these Examples appears to be because of the high proportion of a rare earth metal selected from a group of R elements that effectively prevent the movement of oxygen vacancies compared with the other R elements.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric ceramic layers and a plurality of inner electrode layers that include Ni; and
   outer electrodes located on the multilayer body and electrically connected to the inner electrode layers; wherein the dielectric ceramic layers include a Ba- and Ti-containing perovskite compound, Ca, Mg, R, M, and Si, where R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W;
   a number of parts by mole of each element with respect to 100 parts by mole of the Ti is as follows:
   Ca is 0.10 parts by mole or more and 5.00 parts by mole or less;
   Mg is 0.0010 parts by mole or more and 0.0098 parts by mole or less;
   R in total is 0.50 parts by mole or more and 4.00 parts by mole or less;
   M in total is 0.10 parts by mole or more and 2.00 parts by mole or less; and
   Si is 0.5 parts by mole or more and 2.0 parts by mole or less.

2. The multilayer ceramic capacitor according to claim 1, wherein the R is $R^1$, where $R^1$ denotes at least one selected from Y, Dy, Gd, La, Ho, Er, Sm, and Yb.

3. The multilayer ceramic capacitor according to claim 1, wherein the R includes $R^1$ and $R^2$, where $R^1$ denotes at least one selected from Y, Dy, Gd, La, Ho, Er, Sm, and Yb, and $R^2$ denotes at least one selected from Ce, Pr, Nd, Eu, Tm, Lu, and Tb; and
   a total amount in parts by mole of $R^1$/a total amount in parts by mole of $R^2 \geq 4.0$.

4. The multilayer ceramic capacitor according to claim 1, wherein a central section of crystal grains of the perovskite compound is free of Ca.

5. The multilayer ceramic capacitor according to claim 1, wherein a content of the Zr in a central section of crystal grains of the perovskite compound is about 0.02 parts by mole or less relative to a content of the Ti of 100 parts by mole.

6. The multilayer ceramic capacitor according to claim 1, wherein the perovskite compound includes crystal grains with a core section that is a particle of the perovskite compound and a shell section that is a solid solution of minor elements around particles of the perovskite compound.

7. The multilayer ceramic capacitor according to claim 1, wherein the perovskite compound includes crystal grains with a core section that is a barium titanate particle free of at least Ca and a shell section that is a solid solution of Ca, Mg, R, M and Si around the core section.

8. The multilayer ceramic capacitor according to claim 1, wherein the perovskite compound includes crystal grains with a core section that is a $Ba_mTiO_3$ particle free of Ca, Mg, R, M, and Si and a shell section that is a solid solution of Ca, Mg, R, M, and Si around the core $Ba_mTiO_3$ particle.

9. A multilayer ceramic capacitor comprising:
a multilayer body including a plurality of dielectric ceramic layers and a plurality of inner electrode layers that include Ni; and
outer electrodes located on the multilayer body and electrically connected to the inner electrode layers; wherein
the multilayer body includes a Ba- and Ti-containing perovskite compound, Ca, Mg, R, M, and Si, where R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W;
a number of parts by mole of each element with respect to 100 parts by mole of the Ti is as follows:
Ca is 0.10 parts by mole or more and 5.00 parts by mole or less;
Mg is 0.0010 parts by mole or more and 0.0098 parts by mole or less;
R in total is 0.50 parts by mole or more and 4.00 parts by mole or less;
M in total is 0.10 parts by mole or more and 2.00 parts by mole or less; and
Si is 0.5 parts by mole or more and 2.0 parts by mole or less.

10. The multilayer ceramic capacitor according to claim 9, wherein the R is $R^1$, where $R^1$ denotes at least one selected from Y, Dy, Gd, La, Ho, Er, Sm, and Yb.

11. The multilayer ceramic capacitor according to claim 9, wherein the R includes $R^1$ and $R^2$, where $R^1$ denotes at least one selected from Y, Dy, Gd, La, Ho, Er, Sm, and Yb, and $R^2$ denotes at least one selected from Ce, Pr, Nd, Eu, Tm, Lu, and Tb; and
a total amount in parts by mole of $R^1$/a total amount in parts by mole of $R^2 \geq 4.0$.

12. The multilayer ceramic capacitor according to claim 9, wherein a content of the Zr in a central section of crystal grains of the perovskite compound is about 0.02 parts by mole or less relative to a content of the Ti of 100 parts by mole.

13. The multilayer ceramic capacitor according to claim 9, wherein the perovskite compound includes crystal grains with a core section that is a particle of the perovskite compound and a shell section that is a solid solution of minor elements around particles of the perovskite compound.

14. The multilayer ceramic capacitor according to claim 9, wherein the perovskite compound includes crystal grains with a core section that is a barium titanate particle free of at least Ca and a shell section that is a solid solution of Ca, Mg, R, M and Si around the core section.

15. The multilayer ceramic capacitor according to claim 9, wherein the perovskite compound includes crystal grains with a core section that is a $Ba_mTiO_3$ particle free of Ca, Mg, R, M, and Si and a shell section that is a solid solution of Ca, Mg, R, M, and Si around the core $Ba_mTiO_3$ particle.

16. A multilayer ceramic capacitor comprising:
a multilayer body including a plurality of dielectric ceramic layers and a plurality of inner electrode layers that include Ni; and
outer electrodes located on the multilayer body and electrically connected to the inner electrode layers; wherein
the multilayer body includes a Ba- and Ti-containing perovskite compound, Ca, Mg, R, M, and Si, where R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W;
a number of parts by mole of each element with respect to 100 parts by mole of the Ti in a solution of the multilayer body is as follows:
Ca is 0.10 parts by mole or more and 5.00 parts by mole or less;
Mg is 0.0010 parts by mole or more and 0.0098 parts by mole or less;
R in total is 0.50 parts by mole or more and 4.00 parts by mole or less;
M in total is 0.10 parts by mole or more and 2.00 parts by mole or less; and
Si is 0.5 parts by mole or more and 2.0 parts by mole or less.

17. The multilayer ceramic capacitor according to claim 16, wherein the R is $R^1$, where $R^1$ denotes at least one selected from Y, Dy, Gd, La, Ho, Er, Sm, and Yb.

18. The multilayer ceramic capacitor according to claim 16, wherein the R includes $R^1$ and $R^2$, where $R^1$ denotes at least one selected from Y, Dy, Gd, La, Ho, Er, Sm, and Yb, and $R^2$ denotes at least one selected from Ce, Pr, Nd, Eu, Tm, Lu, and Tb; and
a total amount in parts by mole of $R^1$/a total amount in parts by mole of $R^2 \geq 4.0$.

19. A method for producing a multilayer ceramic capacitor, the method comprising:
mixing a main component powder based on a Ba- and Ti-containing perovskite compound as a main component with a Ca compound, a Mg compound, a compound containing R, a compound containing M, and a Si compound, and then producing a ceramic slurry, where R denotes at least one rare earth metal selected from La, Ce, Pr, Nd, Sm, Eu, Gd, Tb, Dy, Ho, Er, Tm, Yb, Lu, and Y, and M denotes at least one selected from Zr, Mn, Co, Fe, Cr, Cu, Al, V, Mo, and W;
producing ceramic green sheets from the ceramic slurry;
stacking the ceramic green sheets and inner electrode layers into an unfired multilayer body; and
firing the unfired multilayer body to obtain a multilayer body including dielectric ceramic layers and Ni-containing inner electrode layers interposed therebetween; wherein
a number of parts by mole of each element in the ceramic slurry with respect to 100 parts by mole of the Ti is as follows:
Ca is 0.10 parts by mole or more and 5.00 parts by mole or less;
Mg is 0.0010 parts by mole or more and 0.0098 parts by mole or less;
R in total is 0.50 parts by mole or more and 4.00 parts by mole or less;
M in total is 0.10 parts by mole or more and 2.00 parts by mole or less; and
Si is 0.5 parts by mole or more and 2.0 parts by mole or less.

20. The method according to claim 19, wherein the R is $R^1$, where $R^1$ denotes at least one selected from Y, Dy, Gd, La, Ho, Er, Sm, and Yb.

21. The method according to claim 19, wherein the R includes $R^1$ and $R^2$, where $R^1$ denotes at least one selected from Y, Dy, Gd, La, Ho, Er, Sm, and Yb, and $R^2$ denotes at least one selected from Ce, Pr, Nd, Eu, Tm, Lu, and Tb; and a total amount in parts by mole of $R^1$/a total amount in parts by mole of $R^2 \geq 4.0$.

\* \* \* \* \*